United States Patent
Linnenbrink et al.

(10) Patent No.: US 9,028,640 B2
(45) Date of Patent: May 12, 2015

(54) METHOD FOR PRETREATING MOLDED ARTICLES MADE OF PLASTIC MATRIX-FIBER COMPOSITES

(71) Applicant: Sika Technology AG, Baar (CH)

(72) Inventors: Martin Linnenbrink, Apensen (DE); Wolfgang Roock, Appen (DE); Florian Ittrich, Pinneberg (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 14/153,534

(22) Filed: Jan. 13, 2014

(65) Prior Publication Data

US 2014/0124135 A1 May 8, 2014

Related U.S. Application Data

(63) Continuation of application No. PCT/EP2012/063587, filed on Jul. 11, 2012.

(30) Foreign Application Priority Data

Jul. 12, 2011 (EP) .................... 11173608

(51) Int. Cl.
*C09J 5/02* (2006.01)
*C08J 5/12* (2006.01)

(52) U.S. Cl.
CPC .. *C09J 5/02* (2013.01); *C08J 5/128* (2013.01); *C08J 2363/00* (2013.01); *C08J 2475/04* (2013.01); *C09J 2205/31* (2013.01); *C09J 2400/228* (2013.01); *C09J 2463/006* (2013.01); *C09J 2463/008* (2013.01); *C09J 2475/00* (2013.01)

(58) Field of Classification Search
CPC .......................................... C09J 5/02
USPC ..................................... 156/273.3
See application file for complete search history.

(56) References Cited

U.S. PATENT DOCUMENTS

| 5,218,058 A | 6/1993 | Zeitler et al. |
| 5,254,199 A | 10/1993 | Stepanski et al. |
| 7,931,970 B2 * | 4/2011 | Schlingloff et al. ....... 428/423.1 |
| 2005/0016673 A1 * | 1/2005 | Krebs et al. ................ 156/275.7 |
| 2008/0099136 A1 | 5/2008 | Krebs et al. |
| 2010/0297427 A1 | 11/2010 | Schlingloff et al. |

FOREIGN PATENT DOCUMENTS

| CN | 1615349 A | 5/2005 |
| DE | 102007062529 A1 | 6/2009 |
| EP | 0504681 A1 | 9/1992 |
| WO | WO 03/040249 A2 | 5/2003 |

OTHER PUBLICATIONS

International Search Report (PCT/ISA/210) mailed on Aug. 7, 2012, by the European Patent Office as the International Searching Authority for International Application No. PCT/EP2012/063587.

Written Opinion (PCT/ISA/237) mailed on Aug. 7, 2012, by the European Patent Office as the International Searching Authority for International Application No. PCT/EP2012/063587.

"Kohlenstoff-Fasern" In: Jürgen Falbe, Manfred Regitz; "Römpp Chemie Lexikon", 1990, Georg Thieme Verlag, Stuttgart, New York, pp. 2289-2290.

Notification of Transmittal of Translation of International Preliminary Report on Patentability (Forms PCT/IB/338 and PCT/IB/373) and the Written Opinion of the International Searching Authority (Form PCT/ISA/237) issued on Jan. 23, 2014, by the International Bureau of WIPO in corresponding International Application No. PCT/EP2012/063587. (11 pages).

Official Action issued Dec. 3, 2014, in corresponding Chinese Patent Application No. 201280034225.8, with English translation thereof (10 pages).

* cited by examiner

*Primary Examiner* — Daniel Lee

(74) *Attorney, Agent, or Firm* — Buchanan Ingersoll & Rooney PC

(57) ABSTRACT

A method for gluing of shaped bodies made of fiber composite compositions containing a plastic matrix KFZ with polyurethane compositions, the method including: a) application of IR radiation to a defined region of the shaped body of KFZ; b) application of a polyurethane composition to the defined region of the shaped body; c) bonding of the polyurethane composition on the defined region of the shaped body to a substrate; and d) curing of the polyurethane composition. The method is distinguishable by a rapid strengthening (early strength) of the polyurethane composition, so that the bond produced with its use can be machined or stressed already a short time after the application of the polyurethane composition.

20 Claims, No Drawings

METHOD FOR PRETREATING MOLDED ARTICLES MADE OF PLASTIC MATRIX-FIBER COMPOSITES

RELATED APPLICATION(S)

This application claims priority as a continuation application under 35 U.S.C. §120 to PCT/EP2012/063587, which was filed as an International Application on Jul. 11, 2012 designating the U.S., and which claims priority to European Application No. 11173608.8 filed in Europe on Jul. 12, 2011. The entire contents of these applications are hereby incorporated by reference in their entireties.

FIELD

The present disclosure relates to the field of pretreating of fiber composite compositions containing a plastic matrix for their gluing, for example, in automobile construction.

BACKGROUND INFORMATION

Pretreatment methods such as primers or physicochemical methods such as plasma treatments can be used to improve the adhesion of adhesives and sealants. The adhesion of adhesives and sealants to certain substrates is very difficult to achieve.

A fiber composite composition containing a plastic matrix is one substrate that can be difficult to glue. In this case, it is especially difficult to achieve an early strength when using polyurethane adhesives.

SUMMARY

According to an exemplary aspect, provided is a method of gluing a molded article made of a fiber composite composition KFZ containing a plastic matrix, with a polyurethane composition P, the method comprising: a) applying IR radiation to a region DB of the molded article made of a fiber composite composition KFZ containing a plastic matrix; b) applying a polyurethane composition P to the region DB of the molded article; c) bonding the polyurethane composition P on the region DB of the molded article, to a substrate; and d) curing the polyurethane composition P.

DETAILED DESCRIPTION

According to an exemplary aspect, a pretreatment method is provided which improves the adhesion of polyurethane adhesives to fiber composite compositions containing a plastic matrix.

According to an exemplary aspect, a method is provided for gluing of shaped bodies made of fiber composite compositions containing a plastic matrix KFZ with polyurethane compositions P, comprising the steps:
a) application of IR radiation to a defined region DB of the shaped body of KFZ;
b) application of a polyurethane composition P to the defined region DB of the shaped body of KFZ;
c) bonding of the polyurethane composition P on the defined region DB of the shaped body of KFZ to a substrate; and
d) curing of the polyurethane composition P.

An exemplary method is distinguishable by a rapid strengthening (early strength) of the polyurethane composition P, so that the bond produced with its use can be machined or stressed already a short time after the application of the polyurethane composition P and the bonding of the shaped body to the substrate, for example, by walking upon it, by grinding, by transport or by removal from fixtures. After the curing, the bond continues to have a high strength.

According to an exemplary aspect, provided is a method for gluing of shaped bodies made of fiber composite compositions containing a plastic matrix KFZ with polyurethane compositions P, comprising the steps:
a) application of IR radiation to a defined region DB of the shaped body of KFZ;
b) application of a polyurethane composition P to the defined region DB of the shaped body of KFZ;
c) bonding of the polyurethane composition P on the defined region DB of the shaped body of KFZ to a substrate;
d) curing of the polyurethane composition P.

The polyurethane composition P can be a unitary system or a binary system.

By "unitary system" is meant in this context a system in which, for example, one compound from a drum is put out with a dispensing tool and in which the compound can fulfill its function without adding a further compound from a container, such as a secondary component, with the dispensing tool.

By "binary system" is meant in this context a system which, for example, includes a main component and a secondary component. The main and the secondary component can each contain several different chemical compounds. The secondary component can be a component with which the main component can react and result in the polymerization of the main component, for example, by initiation or acceleration, and in the final curing of the main component. By "polymerization" is meant in this document any kind of converting of lower molecular compounds (monomers, oligomers, prepolymers) into high molecular compounds (polymers, macromolecules, polymerizates) and it encompasses polyaddition and polycondensation. Therefore, the main component and the secondary component will be kept in separate containers in order to avoid a spontaneous reaction of the main component with the secondary component. In an exemplary embodiment, the main component is an adhesive and the secondary component is a curing accelerator.

In an exemplary embodiment, the polyurethane composition P is a unitary system containing a polyurethane polymer P1, wherein the polyurethane polymer P1 is obtainable by the reacting of at least one polyol with at least one polyisocyanate.

This reaction can occur in that the polyol and the polyisocyanate are brought to react with usual methods, such as at temperatures of 50° C. to 100° C., optionally with the joint use of suitable catalysts, the polyisocyanate being proportioned such that its isocyanate groups are present in relation to the hydroxyl groups of the polyol in stoichiometric excess. For example, the polyisocyanate is proportioned such that a NCO/OH ratio of ≤2.5, for example, ≤2.2, is employed. By the NCO/OH ratio here is meant the ratio of the number of isocyanate groups used to the number of hydroxyl groups used. For example, after the reacting of the hydroxyl groups of the polyol, a content of isocyanate groups of 0.8 to 2.2 wt. % remains, in relation to the total weight of the polyurethane polymer P1.

As the polyisocyanate for the preparation of the polyurethane polymer P1, the following polyisocyanates or mixtures thereof can be used: 1,6-hexamethylene-diisocyanate (HDI), 2-methylpentamethylene-1,5-diisocyanate, 2,2,4- and 2,4,4-trimethyl-1,6-hexamethylene diisocyanate (TMDI), 1,12-dodecamethylene-diisocyanate, lysine and lysine ester diisocyanate, cyclohexane-1,3- and cyclohexane-1,4-diisocyanate and any given mixtures of these isomers, 1-isocyanato-3,3,5- trimethyl-5-isocyanatomethyl-cyclohexane (=isophorone diisocyanate or IPDI), perhydro-2,4'- and perhydro-4,4'-diphenylmethane diisocyanate (HMDI), 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3- and p-tetramethyl-1,4-xylylene diisocyanate (m- and p-TMXDI), bis-(1-Isocyanato-1-methylethyl)-naphthaline, 2,4- and 2,6-toluylene diisocyanate and any given mixtures of these isomers (TDI), 4,4'-, 2,4'- and 2,2'-diphenylmethane diisocyanate and any given mixtures of these isomers (MDI), 1,3- and 1,4-phenylene diisocyanate, 2,3,5,6-tetramethyl-1,4-diisocyanatobenzene, naphthaline-1,5-diisocyanate (NDI), 3,3'-dimethyl-4,4'-diisocyanatodiphenyl (TODI), oligomers and polymers of the mentioned isocyanates, as well as any given mixtures of the mentioned isocyanates. Examples include MDI, TDI, HDI and IPDI.

Suitable polyols for the preparation of the polyurethane polymer P1 are, for example, polyether polyols, polyester polyols and polycarbonate polyols, as well as mixtures of these polyols.

Suitable as the polyether polyols, also known as polyoxyalkylene polyols or oligoetherols, are those which are polymerization products of ethylene oxide, 1,2-propylene oxide, 1,2- or 2,3-butylene oxide, oxetane, tetrahydrofuran or mixtures thereof, optionally polymerized with the aid of a starter molecule with two or more active hydrogen atoms, such as water, ammonia or compounds with several OH or NH groups such as 1,2-ethane diol, 1,2- and 1,3-propane diol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, bisphenol A, hydrogenated bisphenol A, 1,1,1-trimethylol ethane, 1,1,1-trimethylol propane, glycerine, aniline, as well as mixtures of the mentioned compounds. One can also use both polyoxyalkylene polyols that have a low degree of unsaturation (measured per ASTM D-2849-69 and indicated in milliequivalents of unsaturation per gram of polyol (mEq/g)), prepared for example with the aid of so-called double metal cyanide complex catalysts (DMC catalysts), and polyoxyalkylene polyols with a high degree of unsaturation, prepared for example with the aid of anionic catalysts such as NaOH, KOH, CsOH or alkaline alcoholates.

Suitable are polyoxyethylene polyols and polyoxypropylene polyols, for example, polyoxyethylene diols, polyoxypropylene diols, polyoxyethylene triols and polyoxypropylene triols.

Suitable are polyoxyalkylene diols or polyoxyalkylene triols with a degree of unsaturation less than 0.02 mEq/g and with a molecular weight in the range of 1000 to 30,000 g/mol, as well as polyoxyethylene diols, polyoxyethylene triols, polyoxypropylene diols and polyoxypropylene triols with a molecular weight of 400 to 20,000 g/mol.

Suitable are so-called ethylene oxide-terminated ("EO-endcapped", ethylene oxide-endcapped) polyoxypropylene polyols. The latter are special polyoxypropylene polyoxyethylene polyols, which are obtained, for example, in that pure polyoxypropylene polyols, for example, polyoxypropylene diols and -triols, after the completion of the polypropoxylation reaction with ethylene oxide, are further alkoxylated and thereby have primary hydroxyl groups. Polyoxypropylene polyoxyethylene diols and polyoxypropylene polyoxyethylene triols are exemplary in this case.

Further suitable are styrene-acrylonitrile graft polyether polyols, such as are commercially available, for example, under the trade name Lupranol® from Elastogran GmbH, Germany.

As polyester polyols, suitable are polyesters which carry at least two hydroxyl groups and which are prepared by suitable methods, for example, the polycondensation of hydroxycarboxylic acids or the polycondensation of aliphatic and/or aromatic polycarboxylic acids with divalent or polyvalent alcohols.

Suitable are polyester polyols which are prepared from divalent or trivalent alcohols such as 1,2-ethane diol, diethylene glycol, 1,2-propane diol, dipropylene glycol, 1,4-butane diol, 1,5-pentane diol, 1,6-hexane diol, neopentyl glycol, glycerine, 1,1,1-trimethylol propane or mixtures of the aforementioned alcohols with organic dicarboxylic acids or their anhydrides or esters such as succinic acid, glutaric acid, adipic acid, trimethyladipic acid, suberic acid, azelaic acid, sebacic acid, dodecane-dicarboxylic acid, maleic acid, fumaric acid, dimer fatty acid, phthalic acid, phthalic acid anhydride, isophthalic acid, terephthalic acid, dimethylterephthalate, hexahydrophthalic acid, trimellitic acid and trimellitic acid anhydride or mixtures of the aforementioned acids, as well as polyester polyols from lactones such as ε-caprolactone.

Suitable are polyester diols, for example, those prepared from adipic acid, azelaic acid, sebacic acid, dodecane dicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, 1,4-butane diol, 1,6-hexane diol, dimer fatty acid diol and 1,4-cyclohexane dimethanol as the divalent alcohol.

As the polycarbonate polyols, examples are obtainable by reacting, for example, the above-mentioned alcohols used to produce the polyester polyols, with dialkyl carbonates such as dimethyl carbonate, diaryl carbonates like diphenyl carbonate or phosgene. Suitable are polycarbonate diols, for example, amorphous polycarbonate diols.

Further suitable polyols are poly(meth)acrylate polyols.

These mentioned polyols can have a molecular weight of 250 to 30,000 g/mol, for example, 1000 to 30,000 g/mol, and a mean OH functionality in the range of 1.6 to 3.

Suitable polyols are polyester polyols and polyether polyols, for example, polyoxyethylene polyol, polyoxypropylene polyol and polyoxypropylene polyoxyethylene polyol, for example, polyoxyethylene diol, polyoxypropylene diol, polyoxyethylene triol, polyoxypropylene triol, polyoxypropylene polyoxyethylene diol and polyoxypropylene polyoxyethylene triol.

If the polyurethane composition P is a unitary system containing a polyurethane polymer P1, the polyurethane composition P can have other ingredients besides those already mentioned, such as are familiar to the person skilled in unitary polyurethane chemistry. Such additional ingredients are, for example, solvents, softeners and/or extender fillers such as soot, chalk or talcs, adhesion promoters, especially trialkoxysilanes, and thixotropic agents like amorphous silicic acids, zeolites.

In another exemplary embodiment, the polyurethane composition P is a binary polyurethane composition P2, including a polyol component K1 and a polyisocyanate component K2.

The polyol component K1 comprises at least one polyol, such as are described above as suitable polyols for the preparation of the polyurethane polymer P1, for example, polyether polyols, polyester polyols and polycarbonate polyols as well as mixtures of these polyols.

Furthermore, the polyol component K1 can also comprise other ingredients. For example, curing catalysts are used. Such catalysts can be used for the reaction of polyisocyanates with polyols, optionally also for that with polyamines or water. As examples of such catalysts can be mentioned organotin, organozinc and organobismuth catalysts, such as dibutyl tin dilaurate, or tertiary amines, such as 1,4-diazobicyclo[2.2.2]octane (DABCO).

Further suitable as additional ingredients are diols, for example, polyoxyalkylene diols, and/or diamines. For example, suitable as amines are, for example, aliphatic, araliphatic, cycloaliphatic and toxicologically harmless aromatic amines. By the choice and concentration of suitable amines and catalysts, one can advantageously influence the pot life and the curing behavior, as well as the slippage behavior.

The polyisocyanate component K2 comprises at least one polyisocyanate B1

Suitable as the polyisocyanate B1 are, on the one hand, polyisocyanates B1', as have been described above as being suitable polyisocyanates for the preparation of the polyurethane polymer P1.

On the other hand, especially suitable as the polyisocyanate B1 are polyurethane prepolymers B1" which have at least two isocyanate groups, and which are formed from a reaction of at least one polyisocyanate with a molecular weight of less than 300 g/mol, for example, between 150 g/mol and 270 g/mol, with at least one polyol AB1. Suitable as the polyol AB1 are polyols which are chosen from the group comprising polyether polyols, polyester polyols, polycarbonate polyols, polyols formed from unsaturated monomers, and their mixtures.

For example, these polyols are polyols as were described above as being suitable polyols for the preparation of the polyurethane polymer P1, for example, polyether polyols, polyester polyols and polycarbonate polyols as well as mixtures of these polyols.

The method of preparation of such a polyurethane prepolymer having isocyanate groups is done in familiar fashion and can occur in stoichiometric excess of the polyisocyanate with respect to the polyol. Exemplary polyisocyanates that are suitable for this include 2,4- and 2,6-toluylene diisocyanates (TDI), 2,4'- and 4,4'-diphenylmethane diisocyanate (MDI), 1,6-hexamethylene diisocyanate (HDI) as well as their isomer mixtures and mixtures with each other. MDI is considered to be exemplary.

These mentioned polyols AB1 can have a mean molecular weight of 250 to 30,000 g/mol, for example, 1000 to 8000 g/mol, and can be diols or triols, for example, with a mean OH functionality in the range of 1.6 to 3.

In an exemplary embodiment, there is used a mixture of polyols AB1, being a mixture of diols and triols.

In an exemplary embodiment, the polyisocyanate component K2 comprises at least one polyisocyanate B1' and at least one polyisocyanate polyurethane prepolymer B1".

The two components K1 and K2 can contain other ingredients besides those mentioned such as, for example, are familiar to the skilled person from binary polyurethane chemistry. These can be present in only one or in both components. Such additional ingredients are, for example, solvents, softeners and/or extender fillers, such as soot, chalk or talcs, adhesion promoters, especially trialkoxysilane, and thixotropic agents, such as amorphous silicic acids, zeolites.

When preparing the components, for example, the polyisocyanate component K2, it can be beneficial to make sure that the raw materials are as free as possible of water and that little or no moisture can make contact with the component after its preparation. This can be accomplished, on the one hand, by a physical or chemical drying of the starting substances, and by working under inert gas, usually nitrogen.

The components K1 and K2 can be formulated such that the volume ratio of component K1 and K2 is between 1:3 and 3:1, for example, between 1:2 and 2:1. For example, this ratio is around 1:1. The mix ratio can be such that the NCO groups of component K2 is stoichiometric to the NCO reactive groups, for example, OH groups, of component K1. For example, if the mixing is not done essentially stoichiometrically, i.e., with deviations of more than 5%, the reaction of the components K1 and K2 will not be optimal, resulting in a reduction in the mechanical properties of the cured polyurethane composition. This can apply especially for an excess of the polyol component. While this can also be disadvantageous for an excess of polyisocyanate, the worse mechanical behavior can be at least partly remedied by the subsequent reaction of the unreacted isocyanate groups with moisture, such as the humidity of the air, which may lead to further cross linkage bonds.

The components K1 and K2 are kept separate from each other prior to being used and, for example, only mixed together just prior to being used. The components can be present in a packaging which includes two separate chambers, such that the polyol component K1 is present in the one chamber and the polyisocyanate component K2 in the other chamber. The components K1 and K2 are poured into the chambers of the package and sealed air and moisture tight.

For example, the polyurethane composition P furthermore has at least one filler, while the fraction of filler is 20 to 60 wt. %, for example, 30 to 60 wt. %, in terms of the total weight of the composition. It is entirely possible and may be advantageous to use a mixture of different fillers.

The filler influences both the rheological properties of the uncured composition and the mechanical properties of the cured composition. Suitable fillers are inorganic and organic fillers, such as natural, ground or precipitated calcium carbonates, optionally coated with fatty acids, such as stearates, barium sulfate ($BaSO_4$, also known as barite or heavy spar), calcined kaolins, aluminum oxide, aluminum hydroxide, silicic acids, such as highly dispersed silicic acids from pyrolysis processes, soot, such as industrially produced soot (carbon black; hereinafter called "soot"), PVC powder or hollow spheres. Exemplary fillers are calcium carbonates, calcined kaolins, soot, highly dispersed silicic acids, as well as flame retarding fillers like hydroxides or hydrates, such as hydroxides or hydrates of aluminum, such as aluminum hydroxide.

The fiber composite compositions containing a plastic matrix KFZ are fiber composite compositions which contain a plastic matrix.

Suitable fibers of such fiber composite compositions are fibers chosen from inorganic fibers, such as glass fibers and mineral fibers; metallic fibers and organic fibers. For example, they are organic fibers chosen from aramide fibers, polyester fibers, nylon fibers, Plexiglas fibers, fibers of a homopolymer or copolymer of ethylene and/or propylene. For example, they are carbon fibers.

By "carbon fibers" is meant in the present document industrially produced fibers of carbon-containing starting materials that are transformed by pyrolysis into carbon arranged in graphite form. In the present document, they are numbered among the organic fibers.

By fiber composite is meant throughout the present document a material which is constructed from fibers. The fibers can be short fibers or long fibers, spun, woven or unwoven fibers or filaments. The fibers can be directional or stretched fibers. It can be advantageous to use different fibers, both in geometry and also composition, with each other.

Furthermore, the fiber composite comprises interstices. These interstices are built up by suitable production methods. For example, the interstices are at least partly open and enable the penetration of the plastic matrix. The body composed of fibers can be produced in the most diverse ways familiar to the skilled person. For example, the bodies used are woven fabrics, laid webs or knitted fabrics. For example, the fiber composite is a woven fabric or a laid web, for example, a multi-axial laid web.

Suitable plastic matrices are chosen from epoxy resin, unsaturated polyester resin, vinyl ester resin, phenol-formaldehyde resin, diallyl phthalate resin, (meth)acrylate resin, polyurethane, amino resin, melamine resin and urea resin. Exemplary is epoxy resin. It can be advantageous for the fiber composite composition containing a plastic matrix KFZ to be a plastic matrix comprising at least one epoxy resin.

Shaped bodies made from fiber composite compositions containing a plastic matrix KFZ are produced, for example, by layering webs of fiber composite onto a mold cavity surface, defining the shape of the desired shaped body. The layered webs of fiber composite are soaked and impregnated with uncured, liquid plastic material.

The liquid is uncured precursor material for the plastic material that forms a solid matrix around the fiber composite. The impregnating with the liquid plastic material can be done before or after the layered webs are arranged in the mold. The layers are there compacted into a desired shape and the liquid plastic material is heated and cured to a solid matrix. The cured products, i.e., the shaped bodies made of fiber composite compositions containing a plastic matrix KFZ, can be lightweight and very strong.

Exemplary fiber composite compositions containing a plastic matrix KFZ are produced on the basis of glass fibers and/or carbon fibers in a polyester or epoxy matrix. Such compositions can be produced by various methods in any suitable manner from a polyester or polyepoxide, as well as glass fibers and/or carbon fibers.

For example, the fiber composite compositions containing a plastic matrix KFZ involve a material whose plastic matrix contains epoxy resin and whose fiber composite has carbon fibers.

In an exemplary method, IR radiation is applied to a defined region DB of the shaped body of KFZ in step a). By "shaped body" is meant an object with a three-dimensional extent. For example, it involves shaped bodies with a sheetlike conformation, such as parts of the paneling of motor vehicles. For example, it involves shaped bodies as are employed for example in vehicle construction, aircraft construction, boat construction, or other mechanically highly stressed structural parts.

The steps in an exemplary method take place in the following time sequence; step a) occurs before step b).

The application of the IR radiation to a defined region DB of the shaped body of KFZ in step a) results in a heating of the defined region DB.

It can be advantageous for the adhesion of the polyurethane compositions P on the shaped body for the surface temperature of the defined region DB of the shaped body of KFZ in step a) to be brought for ≥5 s, preferably 5-600 s, for example, preferably for 30-180 s, to a temperature of ≥60° C., for example, 60-200° C., for example, 120-160° C.

Surprisingly, it has been found that the adhesion of the polyurethane composition P can be further improved when the application of IR radiation in step a) is done on the surface away from the defined region DB on which the polyurethane composition P is applied in step b). Thus, if the shaped body is, for example, a shaped body with a sheetlike extent, then it can be advantageous in order to improve the adhesion of the polyurethane composition P on the shaped body to perform the application of the IR radiation in step a) on one side of the defined region DB of the shaped body of KFZ and to apply the polyurethane composition P in step b) to the other side of the defined region DB, that is, the side turned away. Put simply, therefore, IR radiation is applied to the back or reverse side of the shaped body's region DB and the polyurethane composition P is applied to its front side.

The IR radiation in step a) can be IR radiation with a wavelength of 0.78 μm to 50 μm, for example, 1.4 μm to 10 μm, for example, 2 μm to 3 μm.

It can be advantageous to perform a cleaning of the defined region DB of the shaped body of KFZ in advance of step a), for example, a cleaning with solvents.

It can be advantageous for the region DB of the shaped body of KFZ to cool down after step a). For example, the surface temperature of the defined region DB of the shaped body of KFZ between steps a) and b) is ≤30 C.°, for example, 20-30 C.°. For example, the surface temperature of the defined region DB of the shaped body of KFZ between steps a) and b) corresponds to the ambient temperature.

Moreover, it can be advantageous to have a time span between steps a) and b) of 2-200 min, for example, 5-180 min, for example, 5-120 min.

Surprisingly, it has been found that the adhesion of the polyurethane compositions P was further improved by this.

Suitable as the substrates are those which are chosen from concrete, mortar, brick, tile, gypsum, a natural stone like granite or marble, glass, glass ceramic, metal or metal alloy, wood, plastic or varnish.

An exemplary substrate for bonding is a shaped body based on glass fibers and/or carbon fibers in a polyester or epoxy matrix.

It can be advantageous when the substrate in step c) is a shaped body of KFZ, for example, a material whose plastic matrix contains epoxy resin and whose fiber composite has carbon fibers.

The method according to an exemplary embodiment comprises a step d) of curing of the polyurethane composition P.

The curing of the polyurethane composition P is determined primarily by the manner in which the composition is brought into contact with moisture or water.

The moisture required for the curing can come either from the air (humidity) or it can be mixed in with the composition, for example, as a watery paste.

For example, the polyurethane composition P is at least partly cured by the adding of heat, wherein the temperature of the composition during the action of the heating is at least 50° C., for example, between 60° C. and 160° C., for example, between 80° C. and 140° C., for example, between 90° C. and 130° C.

The heat needed for a thermal curing of the composition can be generated by any given energy source. Suitable means of heating are, for example, circulating air ovens, hot air blower or infrared radiator. If at least one of the structural parts is ferromagnetic and/or the composition contains a piezoelectric, ferromagnetic or superparamagnetic material, the heating can also be done by application of magnetic and/or electrical alternating fields, for example, microwaves or induction; this allows an especially quick heating of the described compositions.

Examples

Preparation of Adhesive Composition

To prepare the components K1, the polyol mixture was placed in a vacuum dissolver and, after adding catalyst and desiccating agent to the exclusion of moisture, stirred for 20 minutes at 25° C. Next, this polyol component K1 was poured into one chamber of a side-by-side double cartridge (vol./vol=1:1) of polypropylene and sealed air and moisture-tight with plastic plungers.

For component K2, dried chalk was added to the polyisocyanate and worked in homogeneously under stirring and under vacuum at 25° C. in a vacuum dissolver for 20 minutes. After this, this polyisocyanate component K2 was poured into the second chamber of the aforementioned side-by-side double cartridge and likewise sealed air and moisture-tight with plastic plungers.

Components K1 and K2 were mixed volumetrically 1:1 in the quantity indicated in Table 1 with the aid of a static mixer.

TABLE 1

Adhesive composition

| Example | Adhesive (wt. %) |
|---|---|
| Component K1 | |
| Polyether triol OH equivalent weight 146 g Hydroxyl number 385 mg KOH/g | 40.0 |
| Polypropylene ether triol OH equivalent weight 1600 g Hydroxyl number 35 mg KOH/g | 45.0 |
| Propoxylated bisphenol-A (TAG = 3) | 10 |
| DABCO | 0.2 |
| Zeolite (desiccating agent) | 4.8 |
| Component K2 | |
| Desmodur ® VH 20 | 48.0 |
| Chalk | 52.0 |

Test Methods:

Tensile Shear Strength (ZSF) (Based on DIN EN 1465)

The test bodies of examples 1-10 were prepared from the above-described adhesive composition and two slabs of fiber composite composition containing plastic matrix, whose plastic matrix contains epoxy resin and whose fiber composite has carbon fibers (EK), each with dimension of 100×45×1.5 mm, the glue surface being 15×45 mm with a layer thickness of 1.6 mm. The surface of the EK being glued was first wiped once with a rag soaked in a solvent as indicated in table 2 (cleaning). In examples 6-10 of the disclosure, the surface away from the surface being glued was then heated for 60 s to a temperature of 140° C. with the aid of an IR radiator (Vulkan company, Switzerland, wavelength of the IR radiation 2.5 µm, 1650 Watt). In the comparison examples 1-5, there was no heating by IR radiation prior to the application of the adhesive.

For comparison example 4, the surface being glued was pretreated by means of plasma.

For comparison example 5, the surface being glued was pretreated by means of Scotch-Brite nonwoven from 3M.

After a time as indicated in table 2, the adhesive was applied to one of the surfaces being glued and the EK was bonded. After this, the adhesive was cured by means of heating with the aforementioned IR radiator to 140° C. for 60 seconds. Prior to the applying of the adhesive to the surface being glued, the surface temperature of the surface being glued corresponded to room temperature.

The tension rate was 20 mm/min. The tensile shear strength was determined 2 minutes and 7 days (storage at 23° C. for 7 days) after curing of the adhesive.

The results of these tests of the tensile shear strength are summarized in table 2. The indicated measured values in MPa are mean values from 3 independent trials. Moreover, after the tensile shear test, the fracture pattern was divided into adhesive fracture pattern or cohesive fracture pattern, depending on the adhesive remaining on the EK.

TABLE 2

Tensile shear strength (ZSF) testing and specimen preparation

| Ex. No. | Cleaning with solvent | IR pretreat time (60 s at 140° C.) | Other pretreatment | Time [min] between IR pretreat and application of adhesive | ZSF [MPa] after 2 min, BB | ZSF [MPa] after 7 d, BB |
|---|---|---|---|---|---|---|
| 1 | Isopropanol | no | — | — | 0.6, ad | 10.0, ko |
| 2 | n-Heptane | no | — | — | 0.2, ad | 5.9, ad |
| 3 | Acetone | no | — | — | 0.3, ad | n.a. |
| 4 | Isopropanol | no | Plasma | — | 0.1, ad | 3.6, ad |
| 5 | Isopropanol | no | Scotch-Brite nonwoven, 3M | — | 0.5, ad | 6.8, ad |
| 6 | Isopropanol | yes | — | 5 | 1.6, ko | 10.9, ko. |
| 7 | Isopropanol | yes | — | 30 | 1.6, ko | n.a. |
| 8 | Isopropanol | yes | — | 60 | 1.5, ko | n.a. |
| 9 | Isopropanol | yes | — | 120 | 1.4, ko | n.a. |
| 10 | Isopropanol | yes | — | 180 | 0.8, ad | n.a. |

BB: fracture pattern, ad: adhesive fracture pattern, ko: cohesive fracture pattern It is evident from table 2 that examples 6-10, which were pretreated with IR radiation, have a better tensile shear strength than comparison examples 1-5, both shortly after curing (early strength) and 7 days afterwards. Moreover, examples 6-9 have a cohesive fracture pattern.

It is further evident that examples 6 and 7, which have a time span of 5 min and 30 min, respectively, between the IR pretreatment and the application of the adhesive, have a better early strength than examples 8 to 10, whose time span is 60 min, 120 min, and 180 min, respectively.

Tensile Shear Strength (ZSF) (Based on DIN EN 1465)

The test bodies of examples 11-18 were prepared from the above-described adhesive composition and two slabs of fiber composite composition containing plastic matrix, whose plastic matrix contains epoxy resin and whose fiber composite has carbon fibers (EK), each with dimension of 100×45×1.5 mm, the glue surface being 15×45 mm with a layer thickness of 1.6 mm. The EKs come from different manufacturers (Mfr. 1-4).

The surface of the EK being glued was first wiped once with a rag soaked in isopropanol (cleaning). In examples 15-18 of the disclosure, the surface away from the surface being glued was then heated for 60 s to a temperature of 140° C. with the aid of an IR radiator (Vulkan company, Switzerland, wavelength of the IR radiation 2.5 μm, 1650 Watt). In the comparison examples 11-14, there was no heating by IR radiation.

After 10 min, the adhesive was applied to one of the surfaces being glued and the EK was bonded. Prior to the applying of the adhesive to the surface being glued, the surface temperature of the surface being glued corresponded to room temperature. The adhesive was cured by means of heating with the aforementioned IR radiator to 140° C. for 60 seconds. The tension rate was 20 mm/min. The tensile shear strength was determined 1 minute after the end of curing of the adhesive.

The results of these tests of the tensile shear strength in MPa are summarized in table 3.

TABLE 3

Tensile shear strength (ZSF) testing and specimen preparation

| No. | Cleaning with solvent | IR pretreat time (60 s at 140° C.) | EK manufacturer | Time [min] between IR pretreat and application of adhesive | ZSF [MPa] after 1 min |
|---|---|---|---|---|---|
| 11 | Isopropanol | no | Mfr. 1 | — | 0.2 |
| 12 | Isopropanol | no | Mfr. 2 | — | 0.8 |
| 13 | Isopropanol | no | Mfr. 3 | — | 0.5 |
| 14 | Isopropanol | no | Mfr. 4 | — | 0.8 |
| 15 | Isopropanol | yes | Mfr. 1 | 10 | 0.9 |
| 16 | Isopropanol | yes | Mfr. 2 | 10 | 1.6 |
| 17 | Isopropanol | yes | Mfr. 3 | 10 | 0.8 |
| 18 | Isopropanol | yes | Mfr. 4 | 10 | 1.4 |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of gluing a molded article made of a fiber composite composition KFZ containing a plastic matrix, with a polyurethane composition P, the method comprising:
    a) applying IR radiation to a region DB of the molded article made of a fiber composite composition KFZ containing a plastic matrix;
    b) applying a polyurethane composition P to the region DB of the molded article;
    c) bonding the polyurethane composition P on the region DB of the molded article, to a substrate; and
    d) curing the polyurethane composition P.

2. The method according to claim 1, wherein the plastic matrix comprises at least one epoxy resin.

3. The method according to claim 1, wherein the fibers of the fiber composite composition KFZ include organic fibers.

4. The method according to claim 1, wherein a surface temperature of the region DB of the molded article in step a) is brought to a temperature of 60-200° C.

5. The method according to claim 1, further comprising a step of cleaning the region DB, wherein the step of cleaning the region DB is conducted prior to step a).

6. The method according to claim 5, wherein the step of cleaning the region DB is conducted with a solvent.

7. The method according to claim 1, wherein a surface temperature of the region DB is ≤30° C. between steps a) and b).

8. The method according to claim 1, wherein a time span of 2-200 min elapses between steps a) and b).

9. The method according to claim 1, wherein the substrate in step c) is a second molded article made of a fiber composite composition containing a plastic matrix.

10. The method according to claim 1, wherein in the fiber composite composition KFZ, the plastic matrix includes an epoxy resin and the fibers include carbon fibers.

11. The method according to claim 1, wherein the fibers of the fiber composite composition KFZ include carbon fibers.

12. The method according to claim 1, wherein a surface temperature of the region DB of the molded article in step a) is brought to a temperature of 120-160° C.

13. The method according to claim 1, wherein a surface temperature of the region DB of the molded article in step a) is brought to a temperature of 60-200° C. for 5-600 s.

14. The method according to claim 1, wherein a surface temperature of the region DB of the molded article in step a) is brought to a temperature of 60-200° C. for 30-180 s.

15. The method according to claim 1, wherein a surface temperature of the region DB of the molded article in step a) is brought to a temperature of 120-160° C. for 5-600 s.

16. The method according to claim 1, wherein a surface temperature of the region DB of the molded article in step a) is brought to a temperature of 120-160° C. for 30-180 s.

17. The method according to claim 1, wherein a time span of 5-180 min elapses between steps a) and b).

18. The method according to claim 1, wherein a time span of 5-120 min elapses between steps a) and b).

19. A method of gluing a molded article made of a fiber composite composition KFZ containing a plastic matrix, with a polyurethane composition P, the method comprising:
    a) applying IR radiation to a surface that is away from a region DB of the molded article made of a fiber composite composition KFZ containing a plastic matrix;
    b) applying a polyurethane composition P to the region DB of the molded article;
    c) bonding the polyurethane composition P on the region DB of the molded article, to a substrate; and
    d) curing the polyurethane composition P.

20. The method according to claim 19, wherein the molded article comprises a front side and a back side, and in step a), the IR radiation is applied on to the back side of the molded article, and in step b), the polyurethane composition P is applied to the front side of the molded article.

\* \* \* \* \*